(12) United States Patent
Dapoz et al.

(10) Patent No.: US 11,913,487 B2
(45) Date of Patent: Feb. 27, 2024

(54) SEALING NUT FOR ELECTRIC VEHICLES

(71) Applicant: ILLINOIS TOOL WORKS INC., Glenview, IL (US)

(72) Inventors: Albert J. Dapoz, Sterling Heights, MI (US); Lucas W. Kroeger, Fenton, MI (US); Luke Wallace, Dubuque, IA (US)

(73) Assignee: Illinois Tool Works Inc., Glenview, IL (US)

( * ) Notice: Subject to any disclaimer, the term of this patent is extended or adjusted under 35 U.S.C. 154(b) by 82 days.

(21) Appl. No.: 17/461,253

(22) Filed: Aug. 30, 2021

(65) Prior Publication Data

US 2022/0065282 A1 Mar. 3, 2022

Related U.S. Application Data

(60) Provisional application No. 63/072,465, filed on Aug. 31, 2020.

(51) Int. Cl.
| | |
|---|---|
| *F16B 33/00* | (2006.01) |
| *F16B 37/14* | (2006.01) |
| *H01M 50/249* | (2021.01) |
| *H01M 50/30* | (2021.01) |
| *H01M 50/262* | (2021.01) |

(52) U.S. Cl.
CPC ............ *F16B 33/004* (2013.01); *F16B 37/14* (2013.01); *H01M 50/249* (2021.01); *H01M 50/262* (2021.01); *H01M 50/30* (2021.01); *H01M 2220/20* (2013.01)

(58) Field of Classification Search
CPC ....... F16B 33/004; F16B 37/14; F16B 43/001
See application file for complete search history.

(56) References Cited

U.S. PATENT DOCUMENTS

| | | | | | |
|---|---|---|---|---|---|
| 3,231,288 | A | * | 1/1966 | Hensien | F16J 15/104 277/639 |
| 3,572,414 | A | * | 3/1971 | Onufer | F16B 39/34 411/270 |
| 3,678,979 | A | * | 7/1972 | Bjorklumd | F16B 43/001 411/959 |
| 4,230,326 | A | * | 10/1980 | White | B02C 17/22 16/2.2 |

(Continued)

FOREIGN PATENT DOCUMENTS

| | | |
|---|---|---|
| CN | 106837975 A | 6/2017 |
| CN | 206480680 U | 9/2017 |
| DE | 3618296 A1 | 12/1987 |

(Continued)

OTHER PUBLICATIONS

Machine translation of WO8202579A1 (Year: 1982).*

(Continued)

*Primary Examiner* — Kyle A Cook
(74) *Attorney, Agent, or Firm* — Quarles & Brady LLP

(57) ABSTRACT

A sealing nut for securing a battery vent to a battery cover includes an upper body, a base, a fang extending from the base in a direction opposite the upper body, a flange extending from the base in the direction opposite the upper body, and a channel formed between the fang and the flange. The channel extends annularly around the base and is configured to receive a seal member.

18 Claims, 5 Drawing Sheets

(56) References Cited

U.S. PATENT DOCUMENTS 5,073,073 A * 12/1991 Kazino ................ F16B 35/047
411/386
6,244,807 B1 * 6/2001 Garcia ................ F16B 33/004
411/371.1

FOREIGN PATENT DOCUMENTS

EP 3217481 A1 9/2017
WO WO8202579 A1 * 8/1982

OTHER PUBLICATIONS

International Search Report and the Written Opinion of the International Searching Authority from corresponding PCT Application No. PCT/US2021/048414 dated Nov. 16, 2021 (11 pages).

* cited by examiner

SEALING NUT FOR ELECTRIC VEHICLES

CROSS REFERENCE TO RELATED APPLICATIONS

This application is based on, claims priority to, and incorporates herein by reference in its entirety U.S. Provisional Application No. 63/072,465, filed on Aug. 31, 2020.

BACKGROUND

1. Field of the Disclosure

Embodiments of the present disclosure generally relate to fasteners, such as sealing nuts, for vehicles, such as electric vehicles, for example.

2. Description of the Background

In many assemblies, including automobile assemblies, it can be necessary to connect components with a fastener and to form a seal at a component-fastener interface to seal against water, dirt, and other contaminates. Certain automobiles, including electric vehicles (EVs) can include a battery pack and a battery vent. It can be generally useful to secure the battery vent to the battery pack via a fastener that provides a seal between an exterior of the fastener and the battery vent.

SUMMARY

In one aspect, a sealing nut for securing a battery vent to a battery cover can include an upper body defining an interior channel and a base axially aligned with and radially surrounding the upper body at a transition portion. A fang can extend from the base in a direction opposite the upper body and a flange can extend from the base in a direction opposite the upper body. The flange can be positioned radially inward from the fang relative to the base. A channel can be formed between the fang and the flange. The channel can extend annularly around the base.

In some embodiments, a sealing nut can include a seal seated within a channel. The seal can be configured to be compressed between a battery vent and an upper surface of the channel.

In some embodiments, a sealing nut can include a fang that is formed by first and second side walls that extend axially and radially from the base and terminate at a fang tip.

In some embodiments, a sealing nut can include first and second side walls to form a fang. At least one of the first and second side walls can form an angle with a base of the sealing nut that is between approximately 50 degrees and 70 degrees, inclusive.

In some embodiments, a sealing nut can include a flange and a fang that extend the same axial distance from a base of the sealing nut so that a fang tip of the fang is planar with a bottom surface of the flange.

In some embodiments, a sealing nut can include a fang that is integrally formed with a base of the sealing nut. The fang can extend continuously around the base.

In some embodiments, a sealing nut can include a flange that defines a blunt surface and a fang that defines a pointed edge. Each of the blunt surface and the pointed edge can be configured to engage a battery vent.

In some embodiments, a sealing nut can include a base and an upper body that are integrally formed.

In some embodiments, a sealing nut can include a base that radially surrounds an upper body at a transition portion.

In some embodiments, a sealing nut can include an interior channel that is internally threaded.

In some embodiments, a sealing nut can include an upper body that includes a plurality of flat surfaces opposite the interior channel.

In some embodiments, a sealing nut can include a plurality of flat surfaces that define a hexagonal geometry.

Some embodiments of the invention provide a sealing nut. The sealing nut can include an upper body extending axially from a base and defining a polygonal (e.g., hexagonal or square) geometry. A fang can extend axially from the base in a direction opposite of the upper body. The fang can define a fang point (e.g., when viewed in a two-dimension cross-sectional view, otherwise the fang point may be considered a fang edge) formed by first and second fang walls. A seal can be configured to be compressed against the base at a position radially interior of the fang.

In some embodiments, a sealing nut can include a fang point (or fang edge) that defines an internal angle that is less than approximately 90 degrees.

In some embodiments, a sealing nut can include a second fang extending radially from a base in a direction opposite of an upper body. The second fang can define a second fang point formed by third and fourth fang walls. A channel can be defined between first and second fangs.

In some embodiments, a sealing nut can include a fang that is positioned at an outermost radial position of the base.

In some embodiments, a sealing nut can include an annular flange extending from a base in a direction opposite of an upper body. A channel can be defined between the flange and a fang.

In some embodiments, a sealing nut can include a seal seated in a channel. The seal can be configured to be compressed between a battery cover and an upper surface of the channel.

In some embodiments, a sealing nut can include a fang that extends intermittently around a base of the sealing nut.

In some embodiments, a sealing nut can include an upper body that defines an internally threaded channel configured to engage external threads of a stud to sealingly secure the sealing nut to a battery vent in an electric vehicle.

Some embodiments of the invention provide a method of securing a battery vent to a battery cover in an electric vehicle. The method can include aligning a hole of the battery vent with a hole of the battery cover, inserting a stud through each of the holes of the battery vent and the battery cover, engaging a sealing nut with the stud, and securing the sealing nut relative to the stud so that the sealing nut engages the vent cover and a seal member is compressed between an upper surface of a channel of the sealing nut and the battery vent to secure the battery vent to the battery cover.

In some embodiments, a method of securing a battery vent to a battery cover in an electric vehicle can include securing a sealing nut relative to the stud and embedding a fang of the sealing nut into a capture material of the battery vent.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
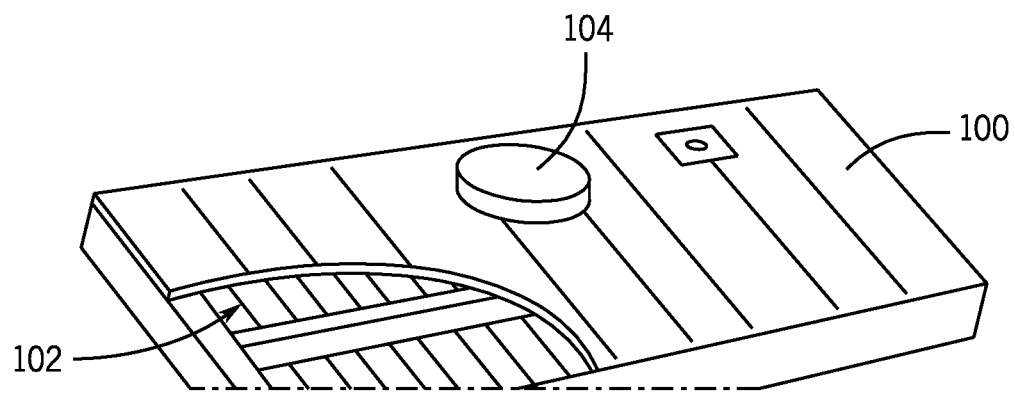
FIG. 1 is an isometric view of a conventional battery pack and a battery vent.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

Embodiments of the present disclosure provide a fastener configured as a sealing nut for automobiles that can provide a seal around an opening. In particular, the sealing nut can be used in electric vehicles (EVs), including battery electric vehicles (BEVs), to secure a battery vent to a battery pack of the EV. While EVs are used as an exemplary application throughout, other applications are possible. For example, the sealing nuts of the present application may be utilized for any venting applications and/or other applications for covering an opening.

With reference to FIG. 1, an example battery pack 100 for an EV is illustrated. The battery pack 100 includes internal battery cells 102 and a battery vent 104. In general, the battery vent 104 can be used to seal the battery pack 100 and the battery cells 102 from water, dirt, and other contaminants. Additionally, the battery vent 104 can allow pressure to be regulated (e.g., equalized) to avoid under pressurization or over pressurization of the battery pack 100. The battery vent 104 can also allow air to be expelled, as needed, from the battery pack 100.

Embodiments of the invention described below with reference to FIGS. 2-7 provide an exemplary fastener configured as a sealing nut. In some embodiments, the sealing nut is configured to secure a battery vent to a battery pack, such as the battery vent 104 to the battery pack 100 of FIG. 1, for example. The sealing nut can be used to secure a vent to a battery pack in a variety of EVs, including BEVs.

Figure 2:
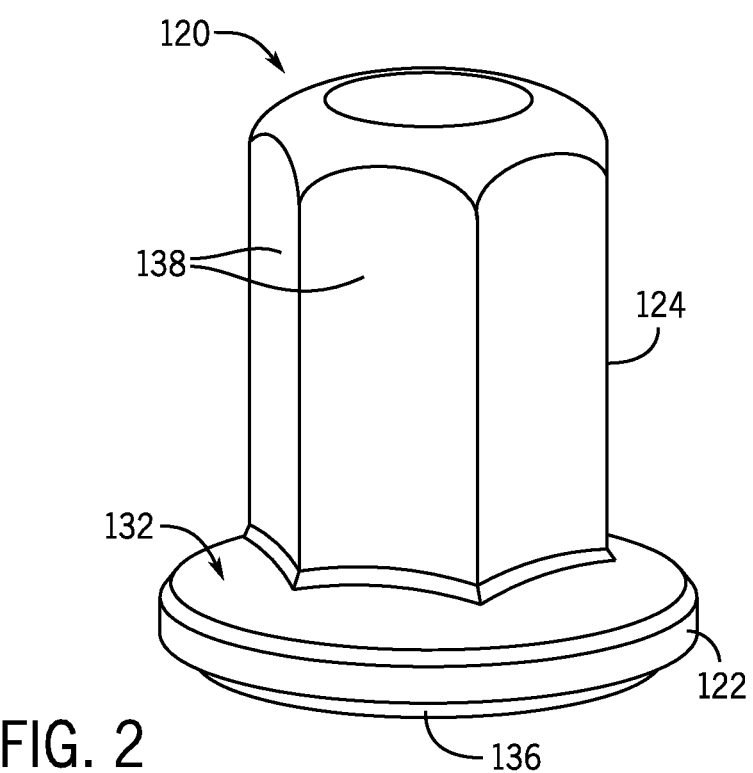
FIG. 2 is a top isometric view of a sealing nut according to an embodiment of the present disclosure.

FIG. 2 illustrates a sealing nut 120 according to an embodiment of the disclosure. The sealing nut 120 includes a base 122 and an upper body 124. The upper body 124 can extend axially from the base 122 and define an interior channel 126 (see, for example, FIG. 5). In the illustrated embodiment, the upper body 124 is integrally formed with the base 122, however, other configurations are possible. For example, in some embodiments, an upper body of a sealing nut can be welded, adhered, overmolded, or otherwise affixed to a base of the sealing nut.

Figure 3:
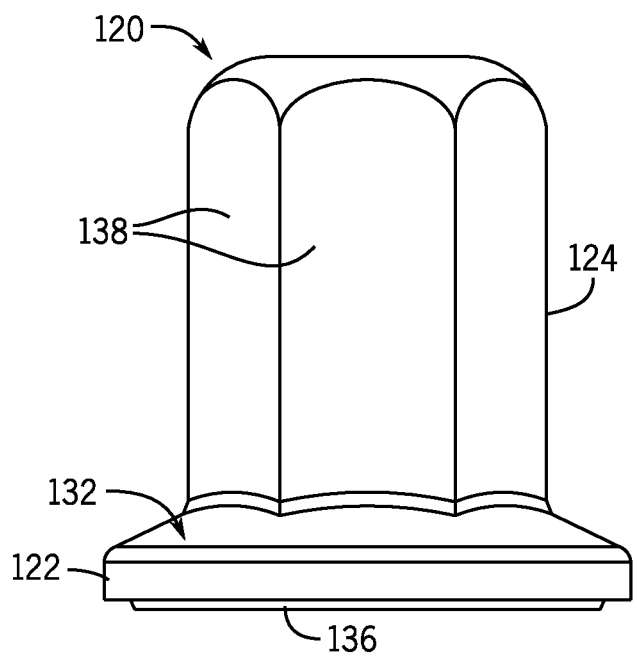
FIG. 3 is a side elevation view of the sealing nut of FIG. 2.

As illustrated in FIG. 3, the base 122 is configured as a base flange of the sealing nut 120 and the upper body 124 extends from the base flange at a transition portion 132 of the sealing nut 120. The transition portion 132 is configured as a sloped surface, however, other geometries are possible. Further illustrated in FIG. 3, the sealing nut 120 also includes a fang 136. The fang 136 is configured as an annular protrusion extending from the base 122 opposite the upper body 124 and will be described in detail below with reference to FIGS. 5 and 6.

Figure 4:
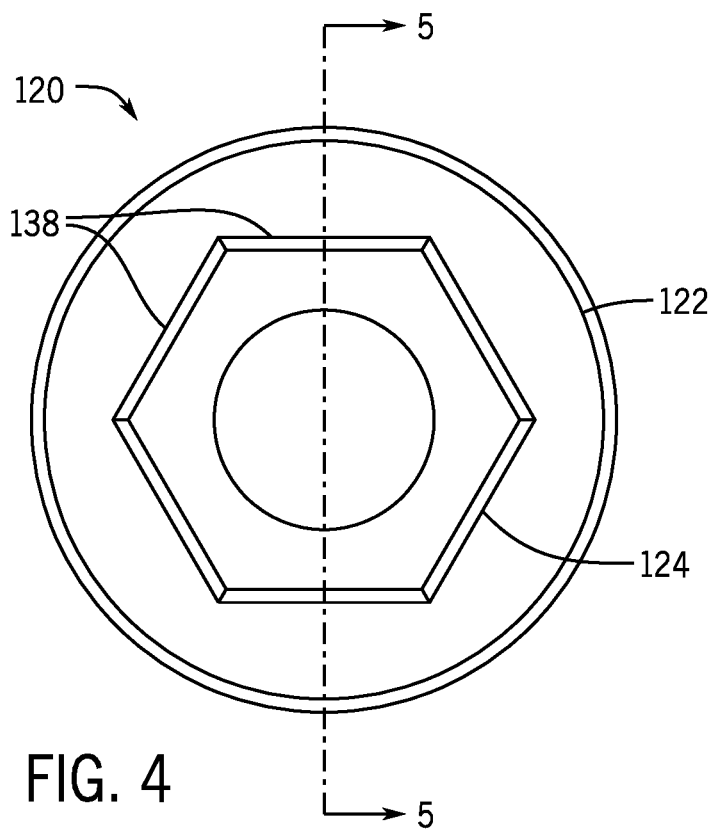
FIG. 4 is a plan view of the sealing nut of FIG. 2.

FIG. 4 illustrates the upper body 124 of the sealing nut 120 defining a hexagonal geometry and having a plurality of flat surfaces 138. In other embodiments, the upper body 124 can define other geometries, including square, oval, circular, or any other suitable shape. In still other embodiments, the upper body 124 may have any suitable number of sides (e.g., 3, 4, 5, 6, 7, 8, 9, 10, etc.). The plurality of flat surfaces 138 are radially disposed about the upper body 124 to form an external surface of the sealing nut 120 opposite the interior channel 126. Additionally, as described above, the base 122 is generally configured as a base flange having a circular geometry and extending radially from the upper body 124 so that the base 122 defines a greater radius than the upper body 124. In other embodiments, the base flange may have any suitable shape.

Figure 5:
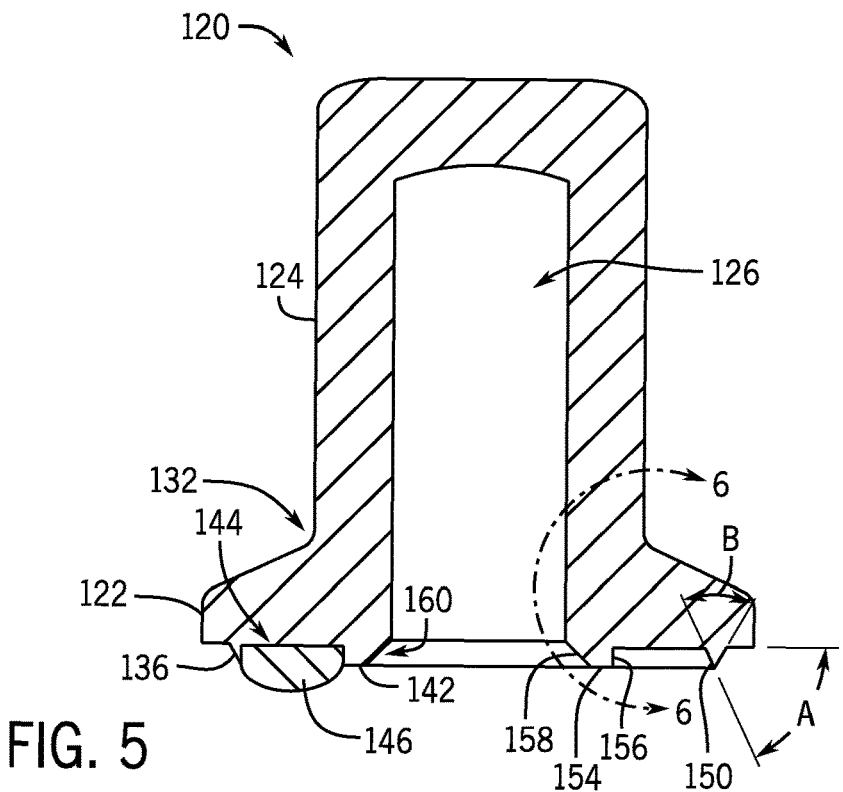
FIG. 5 is a cross-sectional side view of the sealing nut of FIG. 2 taken along line 5-5 of FIG. 4.

With reference to FIG. 5, as described above, the sealing nut 120 defines the interior channel 126 that extends through the base 122 and at least partially through the upper body 124. In some embodiments, the interior channel 126 can include internal threads. In other embodiments, the interior channel 126 can include one or more securing features configured to axially secure a bolt, stud, or other member within the interior channel 126. In general, the interior channel 126 is configured to receive a stud, bolt, or other member therein. In particular, the interior channel 126 may be configured to threadably receive a stud, bolt, or other fastener to axially and/or rotationally secure the sealing nut 120 relative to the other fastener.

As discussed above, the sealing nut 120 includes the fang 136. In some embodiments, the fang 136 may be configured as a continuous annular ring. However, in other embodiments, the fang 136 may only partially extend around the base 122 or may intermittently extend around the base 122 (e.g., as any suitable number of segments). The sealing nut 120 further includes a flange 142. The flange 142 can be configured as a continuous annular projection extending from the base 122 in a direction opposite the upper body 124. However, in some embodiments, the flange may only partially extend around the base 122 or may intermittently extend around the base 122 (e.g., as any suitable number of segments). As illustrated, the flange 142 is positioned radially inward from the fang 136.

Figure 6:
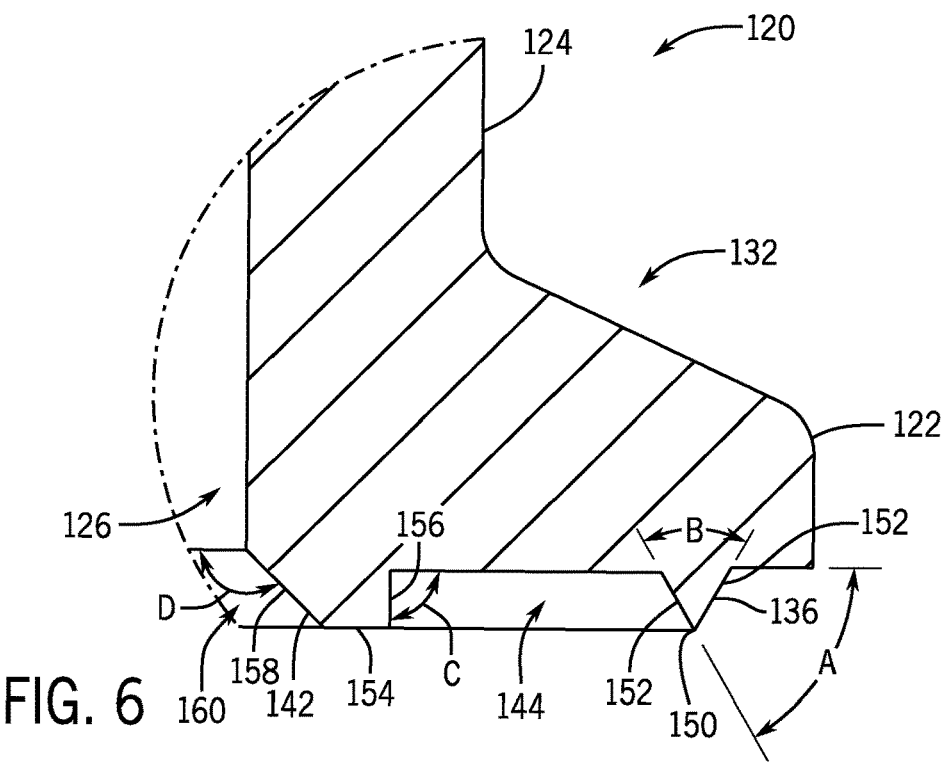
FIG. 6 is a detailed view of the cross-sectional side view of FIG. 5.

As shown in FIGS. 5 and 6, the fang 136 and the flange 142 can form a channel 144 that extends annularly around the base 122, opposite the upper body 124. The channel 144 is radially positioned between the fang 136 and the flange 142 and is configured to receive a seal, such as a seal member 146. In use, the seal member 146 can be positioned between the fang 136 and the flange 142 in the channel 144 and compressed via a sealing surface against which the sealing nut 120 is secured. When the seal member 146 is compressed, the seal member 146 can create a bubble of material that may extend to a tip 150 of the fang 136 or beyond the fang 136. In some embodiments, the seal member 146 may be deposited continuously around the entire channel, or intermittently. In some embodiments, the seal member 146 can include an adhesive backed foam seal. In other embodiments, the seal member 146 may be configured as an O-ring, for example, however, other configurations are possible.

As illustrated in FIG. 6, the fang 136 may be formed from two angled side walls 152 that extend axially and radially from the base 122 to define the fang tip 150. In general, the fang tip 150 is configured as a relatively pointy protrusion (as opposed to blunt) that is configured to provide sealing and traction against a capture material to help form a seal from a radially exterior side of the fang 136 to a radially interior side of the fang 136. In the illustrated embodiment, at least one of the angled side walls 152 can form an angle A with the base 122 that is approximately 50 degrees to approximately 75 degrees, or the angle A might be approximately 65 degrees. In some embodiments, the interior angle B of the fang tip 150 is less than 90 degrees. The interior angle B of the fang tip 150 can provide a sharp edge to improve a sealing engagement with a plastic substrate, such as with a battery vent.

In contrast with the pointed edge of the fang tip 150, the flange 142 defines a relatively blunt edge (e.g., a bottom surface 154). In some embodiments, the bottom surface 154 of the flange 142 extends the same axial distance from the base 122 as the fang tip 150 so that the fang tip 150 is planar with the bottom surface 154 of the flange 142. In the illustrated embodiment, the bottom surface 154 of the flange 142 can be laterally bound by an outer wall 156 and an inner wall 158. In some embodiments, the outer wall 156 of the flange 142 can form an angle C that is about 90 degrees with the base 122 and the inner wall 158 can provide an angle D forming chamfered entrance 160 to the interior channel 126. The angle D may be between about 120 degrees and about 150 degrees. In the illustrated embodiment, each of the fang 136 and the flange 142 are integrally formed with the base 122.

Figure 7:
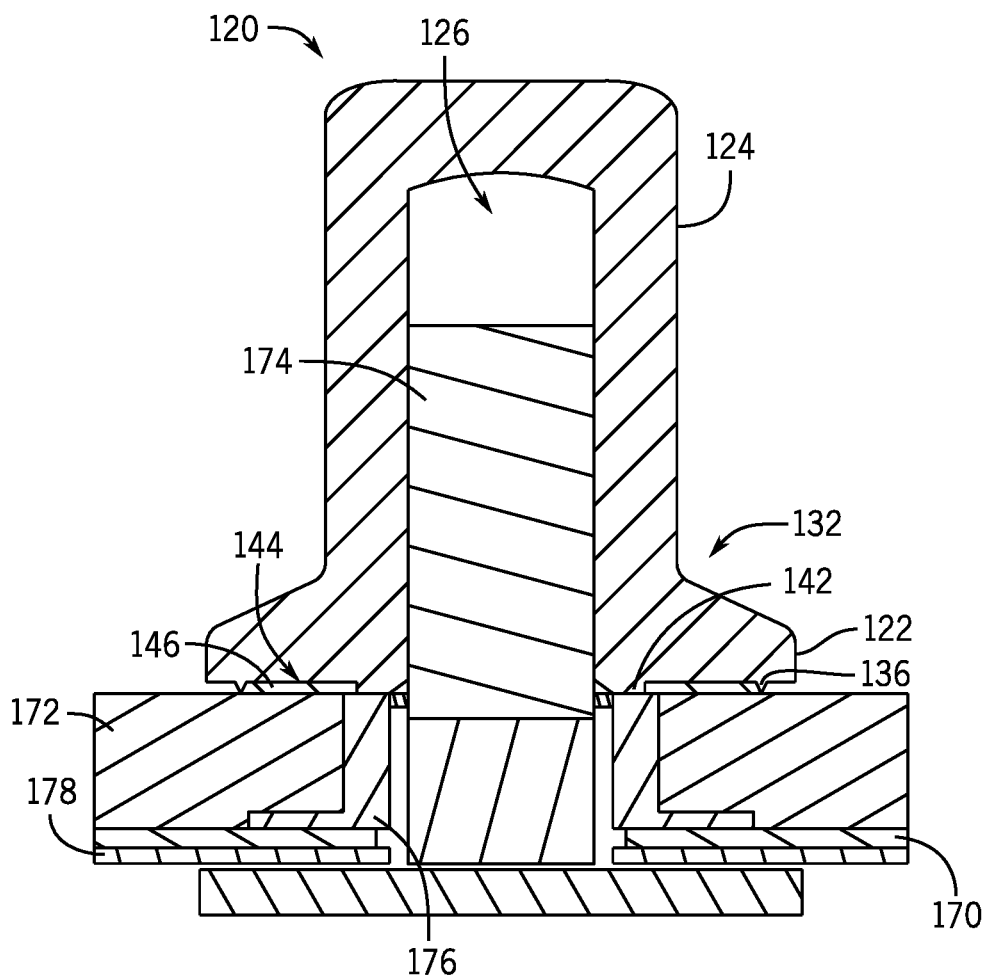
FIG. 7 is a cross-sectional side view of the sealing nut of FIG. 2 secured relative to a battery vent and a battery cover according to an embodiment of the present disclosure.

FIG. 7 illustrates one example configuration of the sealing nut 120 installed on a battery cover 170 to secure a battery vent 172 to the battery cover 170. In the illustrated example, a stud 174 can extend through the battery cover 170 and the battery vent 172 to engage the sealing nut 120 and secure the battery vent 172 to the battery cover 170. The stud 174 can extend through a hole formed in each of the battery cover 170 and the battery vent 172, and a compression limiter 176 can extend between the battery cover 170 and the battery vent 172 and through the hole formed in the battery vent 172. The compression limiter 176 can provide axial structure and support so that when the sealing nut 120 is secured to the stud 174, axial compressive force does not damage or undesirably flex the battery vent 172 between the sealing nut 120 and the battery cover 170.

In the illustrated embodiment, the battery cover 170 also includes a cover reinforcement 178 that is adjacent to the battery cover 170 and opposite the battery vent 172. In use, the sealing nut 120 can be tightened relative to the stud 174 and the seal member 146 can be compressed between the battery vent 172 and an upper surface of the channel 144. Additionally, as the seal member 146 is compressed, it can be generally radially contained by the fang 136 and the flange 142 to form a seal. In some embodiments, the battery vent 172 can include a capture material (e.g., a plastic material) into which the fang 136 can be embedded. In general, the pointed tip 150 of the fang 136 can provide a tight-gripping seal compared to a blunt protrusion to provide a barrier between the external surface of the sealing nut 120 and the holes in the battery vent 172 and the battery cover 170 through which the stud 174 extends.

Figure 8:
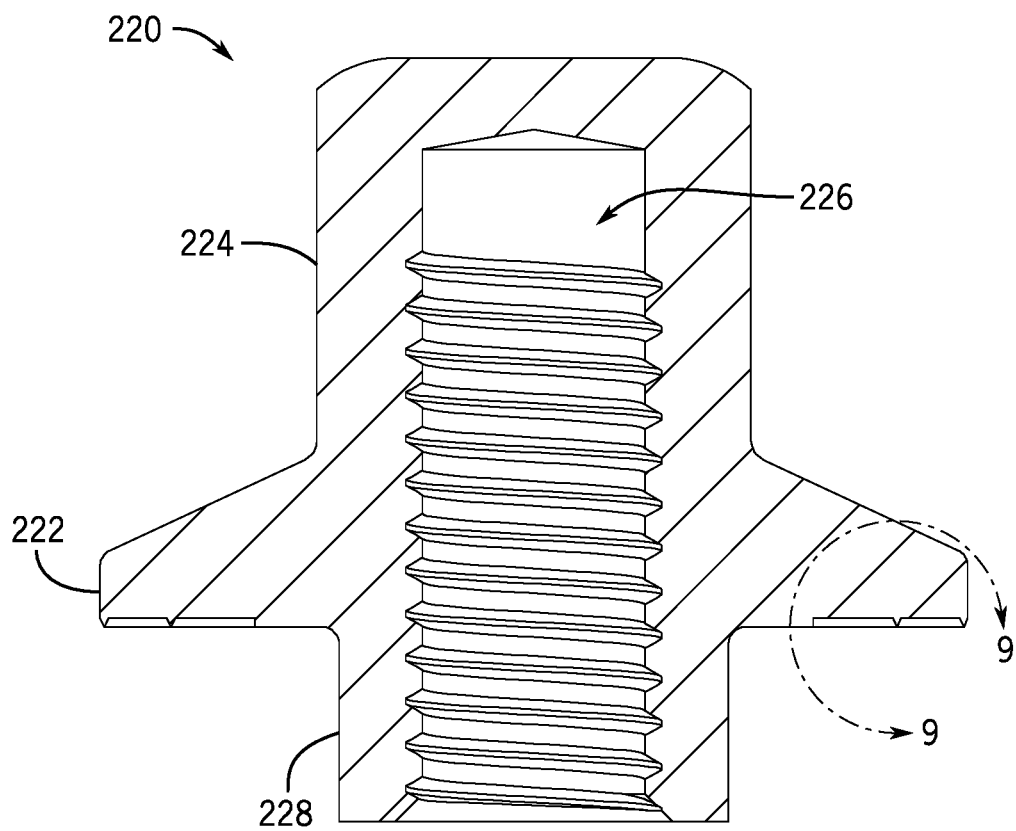
FIG. 8 is a cross-sectional side view of a sealing nut according to an embodiment of the present disclosure.
Figure 9:
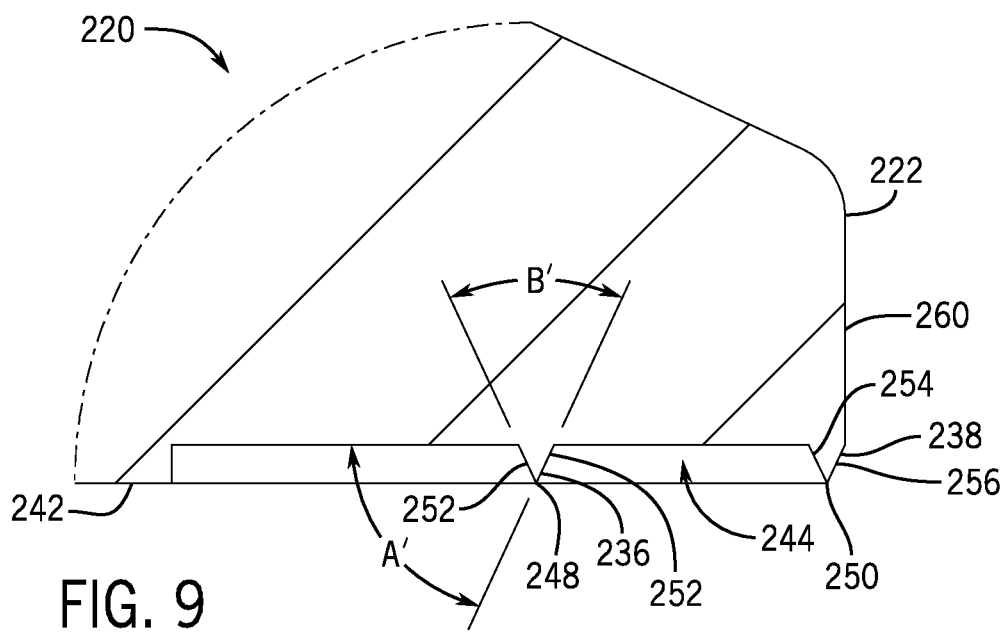
FIG. 9 is a detailed view of the cross-section side view of FIG. 8.

Referring now to FIGS. 8 and 9, another embodiment of a sealing nut 220 is illustrated. Like the sealing nut 120, the sealing nut 220 can be used, for example, to secure a battery vent to a battery pack of an EV or used in other venting applications. FIG. 8 illustrates the sealing nut 220 including a base 222 and an upper body 224, similar to the sealing nut 120. Like the upper body 124, the upper body 224 can extend axially from the base 222 and define an interior channel 226. Additionally, the sealing nut 220 also includes a lower body 228 extending from the base 222 opposite the upper body 224. In some embodiments, the lower body 228 of the sealing nut 220 can provide additional rigidity to the sealing nut 220 and a supplemental sealing barrier. For example, the lower body 228 can extend into a battery vent when the sealing nut 220 is installed on a battery cover, such as the battery cover 170.

With reference to FIG. 9, the sealing nut 220 also includes a first fang 236 and a second fang 238, each configured as annular protrusions (e.g., rings). In some embodiments, one or both of the fangs 236, 238 may only partially extend around the base 222 or may intermittently extend around the base 222 (e.g., as suitable number of segments). Each of the fangs 236, 238 extend from the base 222 opposite the upper body 224. Additionally, similar to the sealing nut 120, the sealing nut 220 further includes a flange 242. The flange 242 can be configured as a continuous annular projection or ledge extending from the base 222 in the direction opposite the upper body 224. As illustrated, the flange 242 is positioned radially inward from the first fang 236, and the first fang 236 is positioned radially inward from the second fang 238.

As further shown in FIG. 9, the first fang 236 and the second fang 238 can form a channel 244 that extends annularly around the base 222, opposite the upper body 224. The channel 244 is radially positioned between the first and second fangs 236, 238 and can be configured to receive a seal, similar to the seal member 146, for example. In use, a seal member can be positioned between the first fang 236 and the second fang 238 in the channel 244 and compressed via a sealing surface against which the sealing nut 220 is secured. Similar to the fang 136 of the sealing nut 120, the first fang 236 can be formed from two angled side walls 252 that extend axially and radially from the base 222 to define a first fang tip 248. In general, the first fang tip 248 can be configured as a relatively point-like protrusion that is configured to provide sealing traction against a capture material to help form a seal from a radially exterior side of the fang 236 to a radially interior side of the fang 236.

In the illustrated embodiment, at least one of the angled side walls 252 can form an angle A' with the base 222 that is between approximately 50 degrees and approximately 75 degrees. In some embodiments, the angle A' can be approximately 65 degrees. Additionally, in some embodiments, an interior angle B' of the first fang tip 248 is less than 90 degrees, inclusive. Similar to the first fang 236, the second fang 238 can be formed from an interior angled wall 254 and an exterior angled wall 256 to define a second fang tip 250. In general, the second fang tip 250 can be configured as a relatively point-like protrusion that is configured to provide sealing traction at a cover surface, such as a battery vent, for example. In some embodiments, the second fang 238 can be geometrically similar to the first fang 236.

As briefly discussed above, the second fang 238 is positioned radially outward from the first fang 236. In the illustrated embodiment, the second fang 238 is positioned proximate to an outer wall 260 of the base 222 at an outermost radial position of the base 222. As shown, the exterior angled wall 256 of the second fang 238 can be configured as an extension of the outer wall 260 of the base 222. However, in other embodiments, the second fang 238 can be positioned radially inward from the outer wall 260 of the base 222, similar to the fang 136 of the sealing nut 120.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

The invention claimed is:

1. A sealing nut for securing a battery vent to a battery cover, the sealing nut comprising:
an upper body defining an interior channel;
a base axially aligned with the upper body and extending in a radial direction from the upper body at a transition portion, the base defining an outer radial edge;
a fang extending from the base in a direction opposite the upper body and offset radially inward from the radial edge of the base, the fang defining a fang tip to facilitate embedding the fang into the battery vent, the fang formed by a radially inner side wall and a radially outer side wall that each extend axially and radially from the base and terminate at the fang tip, the radially inner side wall forming an obtuse angle with the base, and the radially outer side wall forming an obtuse angle with the base at a location along the base between the fang and the radial edge;
a flange extending from the base in the direction opposite the upper body and positioned radially inward from the fang, the flange and the fang tip extending the same axial distance from the base so that the fang tip is planar with a bottom surface of the flange; and
a channel formed between the fang and the flange, the channel extending annularly around the base.

2. The sealing nut of claim 1, further comprising a seal seated within the channel, the seal configured to be compressed between the battery vent and an upper surface of the channel.

3. The sealing nut of claim 1, wherein the fang tip defines an internal angle that is less than 90 degrees.

4. The sealing nut of claim 1, wherein the fang is integrally formed with the base and extends continuously around the base.

5. The sealing nut of claim 1, wherein the flange defines a blunt surface and the fang defines a pointed edge, each of the blunt surface and the pointed edge configured to engage the battery vent.

6. The sealing nut of claim 1, wherein the base and the upper body are integrally formed.

7. The sealing nut of claim 1, wherein the transition portion is a sloped surface.

8. The sealing nut of claim 1, wherein the interior channel is internally threaded.

9. The sealing nut of claim 1, wherein the upper body includes a plurality of flat surfaces opposite the interior channel.

10. The sealing nut of claim 9, wherein the plurality of flat surfaces define a hexagonal geometry.

11. A system, comprising:
a sealing nut assembly for securing a battery vent to a battery cover, the sealing nut assembly comprising:
an upper body extending axially from a base and defining an interior channel;
a first fang extending axially from the base in a direction opposite of the upper body, the first fang defining a first fang point formed by first and second fang walls that each extend axially and radially from the base;
an annular flange extending axially from the base in the direction opposite of the upper body and defining a bottom flange surface, the annular flange extending the same axial distance from the base as the first fang so that the bottom flange surface is planar with the first fang point; and
a seal configured to be compressed against the base at a position radially interior of the first fang; and
a compression limiter that extends between the battery cover and the battery vent to provide axial structural support to prevent the battery vent from flexing between the base and the battery cover.

12. The system of claim 11, wherein the first fang point defines an internal angle that is less than 90 degrees.

13. The system of claim 11, wherein the first fang extends intermittently around the base.

14. The system of claim 11, wherein the interior channel is threaded and configured to engage external threads of a stud to sealingly secure the sealing nut to the battery vent in an electric vehicle.

15. The system of claim 11, further comprising:
a second fang extending axially from the base in the direction opposite of the upper body, the second fang defining a second fang point formed by third and fourth fang walls; and a channel defined between the first fang and the second fang.

16. The system of claim 15, wherein one of the first fang or the second fang is positioned at an outermost radial position of the base.

17. The system of claim 11, further comprising the annular flange, the annular flange having a radially inner side wall that defines an obtuse angle relative to the base to form a chamfered entrance to the interior channel of the upper body; and a channel defined between the first fang and the annular flange.

18. The system of claim 17, wherein the seal is seated in the channel and is configured to be compressed between the battery cover and an upper surface of the channel.

* * * * *